UNITED STATES PATENT OFFICE.

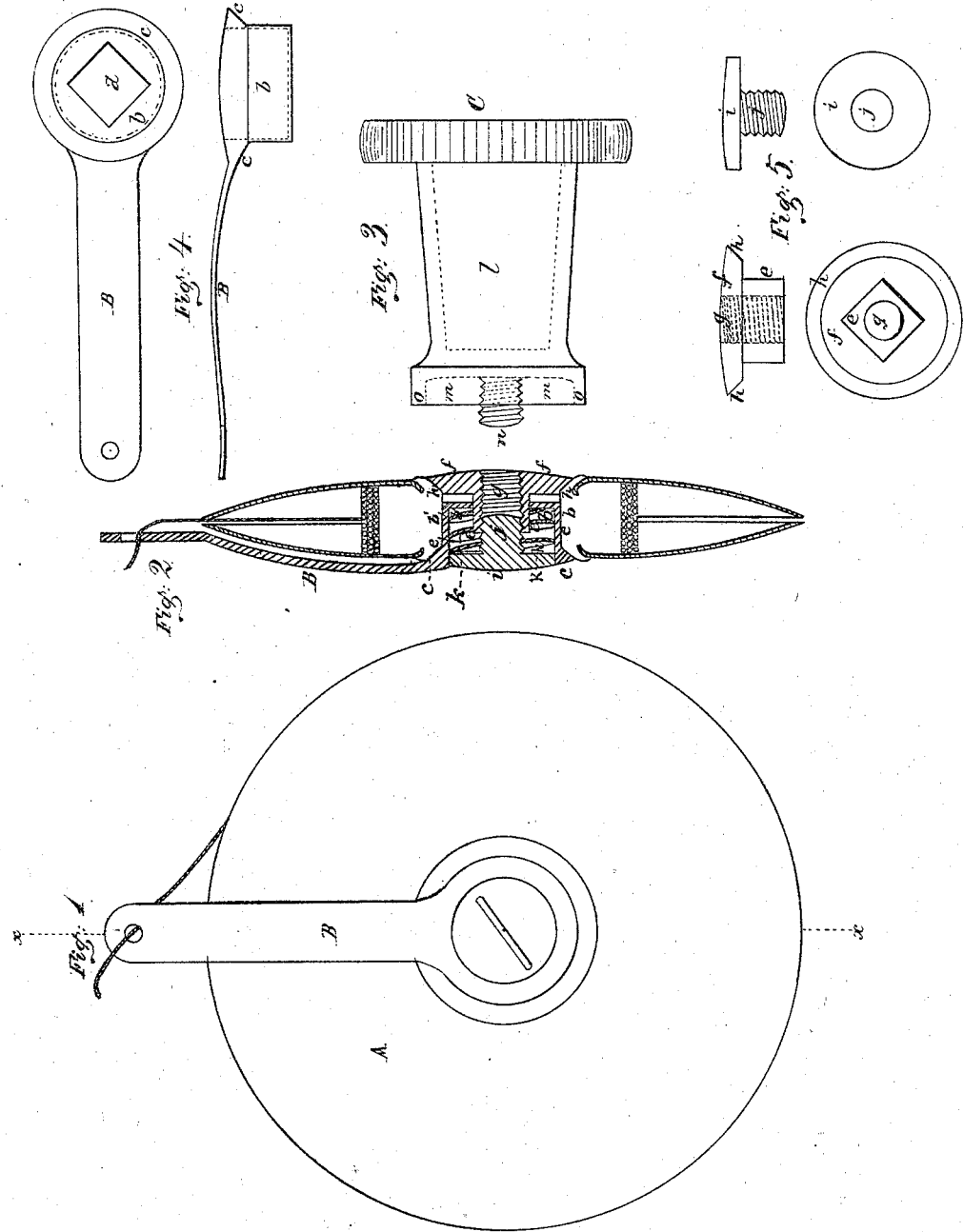

MICHAEL H. KERNAUL, OF BERLIN, PRUSSIA.

IMPROVEMENT IN SEWING-MACHINES.

Specification forming part of Letters Patent No. 138,163, dated April 22, 1873; application filed March 17, 1873.

*To all whom it may concern:*

Be it known that I, MICHAEL HEINRICH KERNAUL, of Berlin, in the Kingdom of Prussia, have invented certain new and useful Improvements in Spools for Sewing-Machines, of which the following is a specification:

The object of my invention is to give a tension to the lower thread of a sewing-machine as well as to the upper thread, whereby the puckering of the material, in sewing a seam, for instance, with a tight upper thread, is entirely avoided, and whereby a much stronger tension can be given to the upper thread in order to produce a tighter and closer seam than would be possible if no tension could be given to the lower thread; and my invention consists of a lever, through the outer end of which the lower thread passes from the spool, which lever forms, with its inner end, one of the pivots around which the spool revolves, and is so arranged that the revolution of the spool around it may be rendered easier or more difficult at pleasure by certain mechanical means hereinafter more fully described, by reason of which the lower thread receives more or less tension as the spool revolves less or more freely.

In the accompanying drawing, Figure 1 represents a side elevation of a sewing-machine spool with its lever attached ready for being placed within its frame in the machine. Fig. 2 represents a vertical section of Fig. 1 in line $x\,x$. Fig. 3 represents a socket used when the spool is to be filled with thread, and in position to be screwed to the spool shown in Fig. 2. Fig. 4 represents face and side elevations of the lever detached from the spool. Fig. 5 represents side and end elevations and plans or top views of the mechanical devices used for holding and adjusting the lever on the spool.

Like letters represent like parts in the several figures of the drawing.

The spool A revolves around the inner end of the lever B, which latter, extending a little beyond the face or side periphery of the spool, is provided at its outer end with a small hole through which the thread from the spool is passed. Its inner end is cup-shaped, as shown at $b$, while a flange, $c$, prevents the cup $b$ from passing into the central opening of the spool beyond a certain point. In the bottom of the cup $b$ is formed a square opening, $d$, (see Fig. 4,) through which the correspondingly square-shaped socket $e$ of a nut, $f$, passes, this nut $f$ being passed into the circular central opening of the spool from the opposite side to the lever, and having its bearing in the square opening $d$ of the cup-end of the lever B. An opening, $g$, provided with a female screw-thread, is formed through the nut $f$ and its square socket $e$, while the nut itself is provided with a flange, $h$, which flange bears against the central portion of the spool, and thus firmly holds the nut in position. Into cup $b$ of the lever B fits the head $i$ of a screw, $j$, which screw fits into the female screw-thread in the square socket $e$ of nut $f$, around which square socket, bearing with one end against the bottom of the cup $b$, and with the other against the head $i$ of screw $j$, lies a spiral spring, $k$.

It will be readily understood that the further the screw $j$ is screwed into the socket $e$ the more the coiled spring will be compressed, and the consequence is that the tendency of one end of the spring is to force the flange $c$ of lever B against the spool by forcing the bottom of the cup $b$ inwardly, while the other end, by bearing against the head $i$ of screw $j$, forces the nut $f$ against the spool on the opposite side. When, therefore, in its normal condition, the screw $j$ does in nowise prevent the spool from turning freely around the pivot formed by the cup $b$ of lever B at one side and the flange $k$ of the nut on the other side, the revolution of the spool is restrained by screwing the screw $j$ further into the socket $e$, thus tightening the thread, while the unscrewing of said screw allows the spool to move more freely by lessening the friction, and thus loosens the thread. The lever B remains always stationary, however. The frame in which the spool is held under the machine requires to be slightly hollowed out to give room for the screw-head $i$ and the nut $f$, which form the pivots of the spool.

In order to wind fresh thread upon the spool I use a socket, C, shown in Fig. 3. This socket, at one end, has a conical opening, $l$, for attachment of the socket on any-sized revolving spindle. In its other end is formed a recess, $m$, from which protrudes centrally a male screw, $n$, which fits in the screw-opening of the nut $f$. When the screw $n$ is screwed into the nut $f$ the latter is drawn into the recess $m$ of the socket C until the head $i$ of screw $j$ has compressed the spring $k$ against the bottom of cup $b$, the flange $o$ of the recess $m$ bearing against the spool. The consequence is that, through screw $j$ and the cup $b$, the lever B is so firmly held with its flange $c$ against the spool that the lever must revolve with the spool while the latter is being filled, and is released again only when the spool is screwed off from socket C. The tension of the lower thread from the spool can thus be regulated by screwing in or out the screw $j$, and, as the spool revolves around central pivots, and is not held by its periphery, the noise which spools usually make in rapidly revolving in their bearings is entirely avoided, and the machine consequently rendered noiseless. The screwing in and out of screw $j$ to regulate the tension can be effected by means of the screw-driver sold with every sewing-machine.

Having described my invention, I claim—

1. The combination with the spool A and lever B, having a cup-shaped end $b$, of the nut $f$, screw $j$, and spring $k$, all arranged to operate essentially as described.

2. In combination with the spool A, lever B, nut $f$, screw $j$, and spring $k$, the socket C, arranged to hold the spool and lever firmly to each other while the spool is being filled, and constructed to operate essentially as described.

MICHAEL HEINRICH KERNAUL.

Witnesses:
  ROBERT GOTTHEIL,
  EDWARD HOMANN.